(12) United States Patent
Conradi et al.

(10) Patent No.: US 9,159,052 B2
(45) Date of Patent: Oct. 13, 2015

(54) GENERALIZING FORMATS OF BUSINESS DATA QUERIES AND RESULTS

(75) Inventors: Christian Conradi, Walldorf (DE); Julian Flintermann, Eppelheim (DE); Justus Rogowski, Heidelberg (DE)

(73) Assignee: SAP SE, Walldorf (DE)

( * ) Notice: Subject to any disclaimer, the term of this patent is extended or adjusted under 35 U.S.C. 154(b) by 390 days.

(21) Appl. No.: 13/467,138

(22) Filed: May 9, 2012

(65) Prior Publication Data
US 2013/0304756 A1 Nov. 14, 2013

(51) Int. Cl.
G06F 17/30 (2006.01)
G06Q 10/10 (2012.01)

(52) U.S. Cl.
CPC .......... *G06Q 10/10* (2013.01); *G06F 17/30483* (2013.01); *G06F 17/30389* (2013.01)

(58) Field of Classification Search
None
See application file for complete search history.

(56) References Cited

U.S. PATENT DOCUMENTS

| | | | |
|---|---|---|---|
| 6,651,055 B1 * | 11/2003 | Kilmer et al. ........................ | 1/1 |
| 6,704,726 B1 * | 3/2004 | Amouroux ............................ | 1/1 |
| 8,126,931 B2 | 2/2012 | Conradi | |
| 2004/0015485 A1 * | 1/2004 | Salerno et al. ..................... | 707/3 |
| 2004/0030682 A1 * | 2/2004 | Porter et al. ....................... | 707/3 |
| 2007/0027876 A1 * | 2/2007 | Graf ................................... | 707/10 |
| 2009/0248634 A1 * | 10/2009 | Allen ................................. | 707/3 |
| 2010/0287135 A1 * | 11/2010 | Bruland et al. ............... | 707/600 |
| 2011/0093487 A1 * | 4/2011 | Le Biannic et al. ........... | 707/765 |
| 2011/0191312 A1 * | 8/2011 | Gutlapalli et al. ............ | 707/706 |

* cited by examiner

*Primary Examiner* — Bai D. Vu
(74) *Attorney, Agent, or Firm* — Fish & Richardson P.C.

(57) ABSTRACT

Methods, systems, and apparatus, including computer programs encoded on a computer storage medium, for adapting formats of data queries into a generic format. A query requesting data stored in a business objects data source is received. The query has a generic format and includes parameters that describe a computer interface implementation configured to execute the query to identify the requested data. Based on the one or more parameters, the computer software interface implementation is identified. The interface implementation specifies an interface-specific query format. The query is converted from the generic query format into the interface-specific query format, and provided to the computer software interface implementation. The interface implementation executes the interface-specific query and obtains the requested data in an interface-specific results format. This data is converted into a generic results format, and provided in response to receiving the query.

18 Claims, 4 Drawing Sheets

GENERALIZING FORMATS OF BUSINESS DATA QUERIES AND RESULTS

TECHNICAL FIELD

The present disclosure relates to software, computer systems, and computer-implemented methods for querying data stored in data sources.

BACKGROUND

Business organizations perform operations, transactions, and business processes using computer software applications, for example, enterprise software. Using enterprise software, a business organization can process large quantities of data distributed across many business objects data sources. For example, a business objects data source can be a computer-readable repository connected to computer systems that implement the enterprise software through wired or wireless networks, for example, the Internet. The data items can be stored in the data sources in one or more of multiple formats, for example, flat files, Structured Query Language (SQL) databases, spreadsheets, comma-separated value (CSV) files, and other business intelligence artifacts.

The enterprise software can enable users to obtain all or portions of the data items stored in one or more business objects data sources, and to analyze the obtained data items to make business-related decisions. For example, to analyze data items stored in one or more of the business objects data sources, a user can specify types of data items, such as metadata associated with the data items, which the user prefers to view. The user can provide the specified types of data items to a query designer. In a design phase, the query designer can design a query (for example, an SQL query) that incorporates the metadata of the data items that the user has specified. The designed query can then be executed on the multiple business objects data sources across which the data items are distributed to identify the data items that satisfy the query. The data items can be retrieved and presented to the user, for example, in the form of one or more business reports.

Computer software applications can be configured to execute operations to setup, configure, and execute a query. Specifically, the applications can be configured based on the underlying business software applications that are executed to retrieve data from the business objects data sources. In some situations, multiple computer software applications that each is configured to execute a query may need to be independently configured to adapt to the underlying business software applications. In addition, developers who use such applications may also need to be trained to use each computer software application.

SUMMARY

The present disclosure involves systems, software, and computer-implemented methods for generalizing formats of business data queries and results.

In general, one innovative aspect of the subject matter described in this disclosure can be implemented by data processing apparatus. A query requesting data stored in a business objects data source is received. The query has a generic query format and includes one or more parameters that least in part describes a computer software interface implementation configured to execute the query to identify the data requested in the query. Based on the one or more parameters, the computer software interface implementation that is configured to execute the query is identified. The computer software interface implementation specifies an interface-specific query format. The query is converted from the generic query format into the interface-specific query format, and provided to the computer software interface implementation.

This, and other aspects, can include one or more of the following features. The computer software interface implementation executes the interface-specific query to identify the data requested in the query and obtains the data in an interface-specific results format. The method can include receiving the data requested in the query in the interface-specific results format, converting the data from the interface-specific results format into a generic results format, and providing the data in the generic results format in response to receiving the query. The one or more parameters can specify the computer software interface implementation that is configured to execute the query. Identifying the computer software interface implementation can include identifying the computer software interface implementation specified in the one or more parameters. The one or more parameters can specify the business objects data source on which the query is to be executed. Identifying the computer software interface implementation can include identifying the computer software interface implementation configured to execute the query on the business objects data source. Identifying the computer software interface implementation can include identifying multiple computer software interface implementations, each of which is configured to execute the query, identifying, for each of the multiple computer software interface implementations, a connection between a respective computer software interface implementation and the business objects data source that stores the data requested in the search query, and selecting a particular computer software interface implementation as the computer software interface implementation to execute the query based on a particular connection between the particular computer software interface implementation and the business objects data source. The particular connection can be a direct connection and the particular computer software interface implementation can be a Business Intelligence Consumer Services (BICS) interface implementation. The particular connection can be either a direct connection or a remote connection, and the particular computer software interface implementation can be a multi-dimensional expression (MDX) interface implementation. Receiving the query, identifying the computer software interface implementation, and converting the query can be implemented as a computer software layer positioned between a consumer software application layer from which the query is received and a layer in which the multiple computer software interface implementations are implemented.

Another innovative aspect of the subject matter described here can be implemented as a non-transitory computer-readable medium storing computer software instructions executable by one or more data processing apparatus to perform operations described here. A further innovative aspect of the subject matter described here can be implemented as a system that includes one or more data processing apparatus and a non-transitory computer-readable medium storing computer software instructions executable by one or more data processing apparatus to perform operations described here.

While generally described as computer-implemented software embodied on tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description below. Other features and advantages of the disclosure will be apparent from the description and drawings, and from the claims.

BRIEF DESCRIPTION OF THE DRAWINGS

Like reference numbers and designations in the various drawings indicate like elements.

DETAILED DESCRIPTION

Business organizations generate and process large quantities of raw data describing the organization. A client, which can be any branch of the business organization (or a $3^{rd}$ party external to the organization), may desire to obtain portions of the raw data for analysis purposes. Using computer software applications, the client can design a query describing the portions of the raw data that the client desires. The query can additionally describe a manner in which the requested data should be organized when delivered to the client.

Certain computer software interface implementations can configure and execute such queries to retrieve and provide the requested data. For example, Business Intelligence Consumer Services (BICS) is one type of interface implementations for queries, for example, BEx queries. BICS is capable of dealing with hierarchies and other business warehouse specific features. Multi-dimensional expressions (MDX) is another example of an interface implementation which uses multi-dimensional data for queries. An MDX expression can return a multi-dimensional result set (data set) that can include axis data and cell data. A further example of an interface implementation is an InfoSet (query) interface implementation that describes data sources that are usually defined as joins for OLTP data objects. An InfoSet interface implementation can be implemented as a semantic layer over the data sources.

Each interface implementation is implemented as computer software instructions executed by data processing apparatus. Because each interface implementation can be encoded differently, a setup and configuration of a query may vary based on the computer software implementation that will execute the query. A client can implement a computer software application to interface with each interface implementation. Because each interface implementation can be encoded differently, the computer software application implemented by the client may need to be encoded to interface with each interface implementation. In some situations, the client may need to implement multiple computer software applications, each configured to interface with a respective interface implementation. The techniques described in this specification provide a single, unified interface layer to which the client's computer software application can interface to execute and receive queries for data. As described below, the single, unified interface layer can be encoded to interface with each of multiple interface implementations. Through the unified interface layer, the client can provide query terms in a generic query format An interface implementation sets up and executes a query based on the query terms that the unified interface layer receives. To do so, the interface implementation may need to receive the query terms in an interface-specific query format. The unified interface layer can be encoded to adapt the query terms in the generic format into an interface-specific query format that is specific to any one of multiple interface implementations, and to provide the query terms adapted in the interface-specific format to the interface implementation. The interface implementation then generates and executes the query against one business objects data sources, and receives data that satisfies the query in an interface-specific results format. The unified interface layer is encoded to convert the results in the interface-specific results format to a generic format, and to provide the data that satisfies the query terms in the generic results format to the client.

Figure 1:
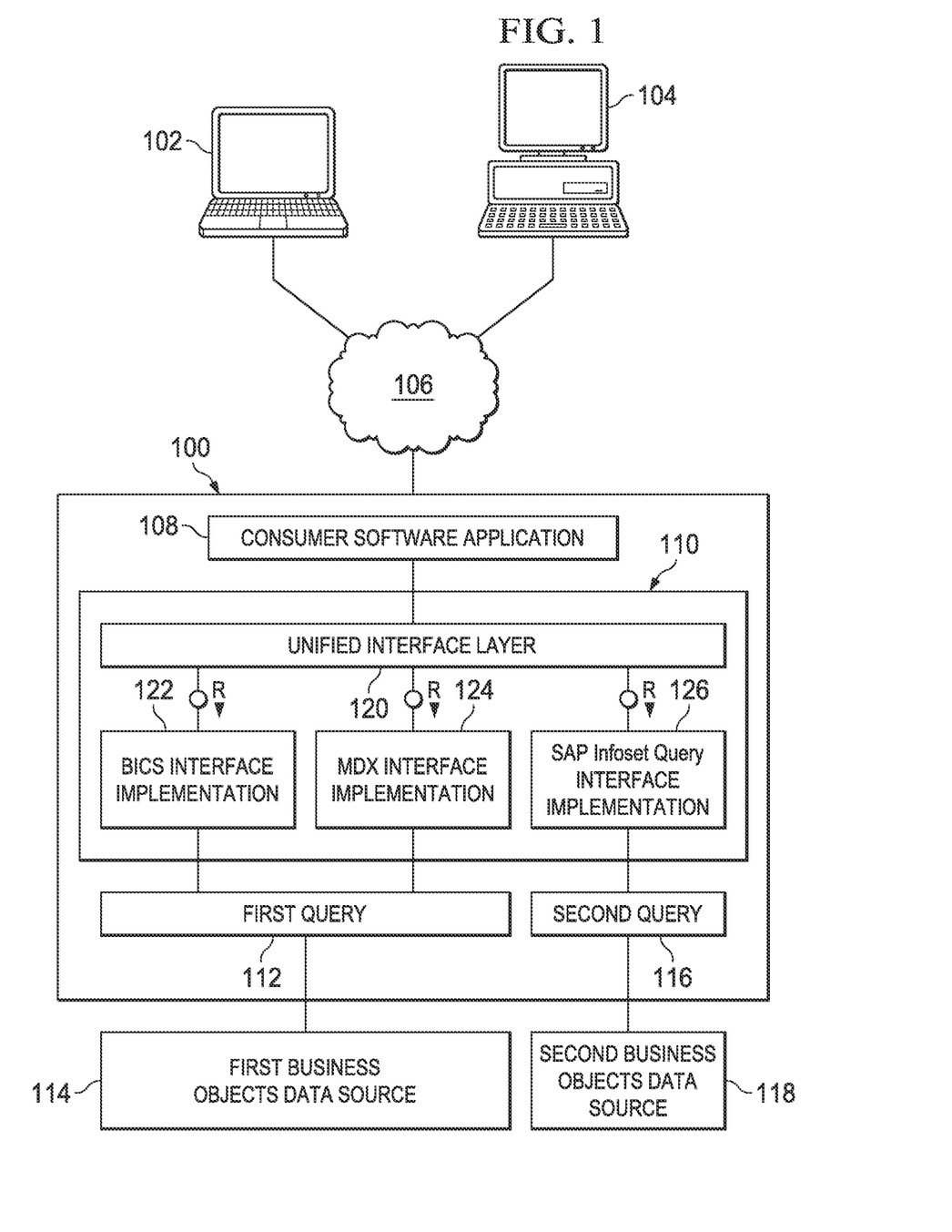
FIG. 1 illustrates an example of a computer system implementing a unified interface layer that communicates a query to computer software interface implementations that can execute the query.

Implementing the techniques described in this specification may provide one or more potential advantages. The unified interface layer described below can be technology independent with respect to a manner in which a query is accessed. The layer can include computer software instructions stored on a computer-readable medium and executable by data processing apparatus. The layer can be implemented, for example, as a plug-in, that can interface with computer software applications implemented by the client without needing to be encoded to be adaptable to the computer software applications. The level of abstraction with which the unified interface layer is encoded can remain hidden from the client's computer software applications. Consequently, any client computer software application that can interface with the level of abstraction of the unified interface layer can be connected to the layer to provide queries to multiple interface implementations. FIG. 1 illustrates an example of a computer system 100 implementing a unified interface layer 120 that communicates a query to computer software interface implementations (a first interface implementation 122, a second interface implementation 124, a third interface implementation 126) that can execute the query. The computer system 100 can include data processing apparatus that can execute computer software instructions to implement the unified interface layer 120 and to perform operations described here. In some implementations, the computer system 100 can implement the unified interface layer 120 to receive a query requesting data stored in a business objects data source. The query can have a generic format and can include metadata that at least in part describes a computer software interface implementation configured to execute the query to identify the data requested in the query. Based on the metadata, the computer system 100 can implement the unified interface layer 120 to identify the computer software interface implementation that is configured to execute the query. The computer software interface implementation specifies an interface-specific query format. The computer system 100 can implement the unified interface layer 120 to convert the query from the generic query format into the interface-specific query format, and to provide the interface-specific query format to the computer software interface implementation.

The computer software interface implementation executes the interface-specific query against the business objects data sources that store the data. By doing so, the implementation identifies the data that satisfies the query. The interface implementation further obtains the data in an interface-specific results format. The computer system 100 can implement the unified interface layer 120 to receive the data requested in the interface-specific results format, and to convert the data from the interface-specific results format into a generic results format. The computer system 100 can additionally implement the unified interface layer 120 to provide the data in the generic results format in response to receiving the query. In this manner, the unified interface layer 120 can be a technology-independent layer that can convert a query in a generic format into an interface-specific query format and that can convert data that satisfies the query in an interface-specific results format into a generic results format.

One or more client devices—for example, a first client device 102, a second client device 104, and the like—can be connected to the computer system 100—for example, the consumer software application 108—through one or more wired or wireless networks 106 such as the Internet. A client device can include a desktop computer, a laptop computer, a tablet computer, a mobile device, a smart phone, a personal digital assistant (PDA), and the like. A user of a client device can provide a query (described below) requesting data stored in a business data source to the computer system 100. In some implementations, a query can include parameters of a value help, for example, a range of values stored in a business objects data source or a business data warehouse (or both) from which results are to be filtered. For example, a user of a client device can specify data (for example, sales figures) that the user desires to see on a Y axis of a graph plotted against multiple countries on an X axis of the graph.

In some implementations, the computer system 100 can implement a consumer software application 108 that can receive the query. The consumer software application 108 can be implemented as computer software instructions executable by data processing apparatus. The consumer software application 108 can be implemented either by the computer system 100 or by another computer system that is connected to the computer system 100. The consumer software application 108 can interface with the client devices to receive the query. The query can include one or more query terms and metadata describing one or more of the query terms, the requested data, the business objects data source in which the requested data is stored, an interface implementation that can execute the query against the business objects data source, or combinations of them. The query terms can include, for example, The consumer software application 108 can additionally interface with the unified interface layer 120 to provide the query received in a generic format to the unified interface layer 120. Because the unified interface layer 120 can adapt a query into a format of an interface implementation, the consumer software application 108 need not be configured to interface with each interface implementation but instead can be configured to interface with a single unified interface layer 120.

In some implementations, the computer system 100 can implement the consumer software application 108, and generate and store the queries—for example, a first query 112, a second query 116, and the like—in addition to implementing the unified interface layer 120 including the interface implementations. For example, the computer system 100 can implement the unified interface layer 120 as an intermediary layer between the consumer software application 108 and the queries.

The computer system 100 can additionally be connected to and interface with multiple business objects data sources—for example, a first business objects data source 114, a second business objects data source 116, and the like—each of which can store data describing one or more aspects of a business organization. Alternatively, or in addition, a business objects data source can include a business data warehouse that can receive business data from multiple business objects data sources and store all or portions of the data in a central location accessible to each aspect of the business organization and the computer system 100. A query developed by a computer software interface implementation can be executed against a business objects data source.

The consumer software application 108 need not be modified to interface with any of the interface implementations. Similarly, none of the interface implementations need be modified to interface with any consumer software application 108. Rather, the computer system 100 can implement the unified interface layer 120 to interface with any consumer software application 108 and with any interface implementation. By doing so, the unified interface layer 120 can automatically identify the computer software interface implementation that can generate a query received in a generic format from any consumer software application 108, and can convert the query from the generic format to a format that is specific to the identified computer software interface implementation. In some implementations, the query received from the client device can include one or more parameter values, one or more user input, or combinations of them that can specify the computer software interface implementation that is configured to execute the query. Alternatively, or in addition, the parameter values or the user input can specify a business objects data source on which the query is to be executed. The computer system 100 can implement the unified interface layer 120 to identify the interface implementation that can execute the query. Using the identified interface implementation, the computer system 100 can execute the query to fetch the metadata (for example, dimensions, measures, variables) specified by the query.

In further implementations, the computer system 100 can implement the unified interface layer 120 to identify multiple computer software interface implementations, each of which is configured to execute the query. For each of the multiple interface implementations, the unified interface layer 120 can identify a connection between a respective computer software interface implementation and the business objects data source that stores the data requested in the search query. The unified interface layer 120 can select a particular interface implementation based on a particular connection between the particular interface implementation and the business objects data source. For example, a business warehouse (BW) query and an InfoSet query can access different data, and consequently can be executed by respective, distinct interface implementations. The BW query can be executed on a business warehouse whereas an InfoSet query can be executed on another business objects data source. The unified interface layer 120 can select an interface implementation—for example, either a BICS interface implementation or an MDX interface implementation if the query is a BW query or an InfoSet interface implementation if the query is an InfoSet query—based on a connection between the particular interface implementation and either the BW or the business objects data source.

Figure 2:
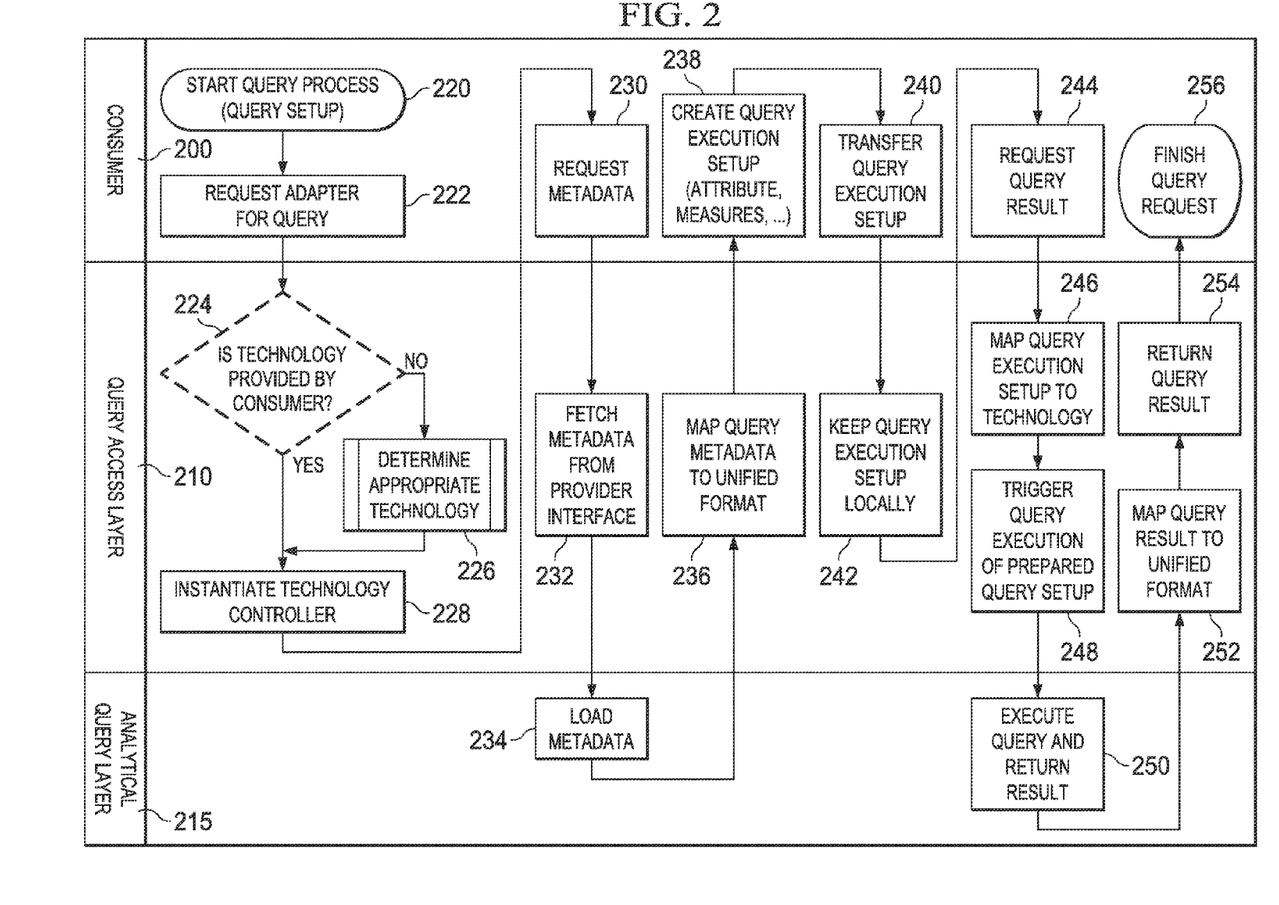
FIG. 2 illustrates a flowchart including swim lanes showing interactions between an example consumer, an example query access layer, and an example analytical query layer.

FIG. 2 illustrates a flowchart including swim lanes showing interactions between an example consumer, an example query access layer, and an example analytical query layer. The consumer 200 and the query access layer 210 can be an example of a consumer software application 108 and an unified interface layer 120, respectively, described above. An analytical query layer 215 can be an example of a layer in which the interface implementations are implemented. In the example described with reference to FIG. 2, the consumer 200 receives a single query and the query access layer 210 adapts the single query into a format of an interface implementation implemented by the analytical query layer 215. In some situations, the consumer 200 can receive multiple queries simultaneously, for example, from multiple client devices, and can adapt each query into a respective interface-specific format. In this manner, the query access layer 210 can be configured to process multiple queries in parallel or in series or combinations of them.

At 220, the consumer 200 can start a query process to set up the query that the consumer 200 has received from a client device. At 222, the consumer 200 can request an adapter for the query. To do so, the consumer 200 can provide the query, which can include query terms and metadata, to the query access layer 210. At 224, the query access layer 210 can check if the technology, i.e., the interface implementation is provided by the consumer 200. If the consumer has provided the technology (decision branch "YES"), then the query access layer 210 can instantiate the technology controller at 228. For example, the consumer 200 can specify the interface implementation in the parameter settings.

If the consumer has not provided the technology (decision branch "NO"), then the query access layer 210 can determine the appropriate technology at 226. For example, the query access layer 210 can determine the appropriate interface implementation based on the query to be executed. If the query is a BW query, then the query access layer 210 can determine that the appropriate interface implementation is a BICS interface implementation or an MDX interface implementation. If the query is an InfoSet query, then the query access layer 210 can determine that the appropriate query is an InfoSet interface implementation. In some implementations, the unified access layer 120 can determine that an MDX interface implementation is appropriate for a remote connection (i.e., a system to system connection) between the client device and the consumer 200 whereas a BICS interface implementation is appropriate if the connection between the client device and the consumer 200 is a local connection (i.e., a wired connection). In some implementations, the remote connection can be a connection from an Enterprise Resource Planning (ERP) application server implementing a consumer application and the unified access layer 120, and another server, for example, a business warehouse with the query that shall be executed.

After the query access layer 210 has identified the appropriate interface implementation, the consumer 200 requests metadata at 230. The consumer 200 can request the metadata/information about the query (for example, dimensions, measures, filters, and the like) from the unified access layer 120. The access layer 120 can be triggered by the consumer 200, which can then request the metadata of the query from the respective query interface (for example, BICS). At 232, the query access layer 210 fetches the metadata from the provider interface, for example, the consumer 200. At 234, the analytical query layer 215 loads the metadata. For example, the query access layer 210 loads the metadata from the interface implementation selected as described above. At 236, the query access layer maps the query metadata to the unified format of the interface implementation. At 238, the consumer 200 creates a query execution setup, which can include, for example, attributes, measures, and the like. At 240, the consumer 200 transfers the query execution set up to the query access layer 210, which the query access layer 210 keeps locally at 242. At 244, the consumer 200 requests query result. In response, the consumer 200 maps the query execution setup to the technology, i.e., the appropriate interface implementation, at 246. At 248, the query access layer triggers the query execution of the prepared query setup. At 250, the analytical query layer 215, i.e., the appropriate interface implementation, executes the query against the appropriate business objects data sources and return a result. At 252, the query access layer 200 maps the result to the unified format, and, at 254, returns the result to the consumer 200. At 256, the consumer 200 provides the result thereby finishing the query request.

Figure 3:
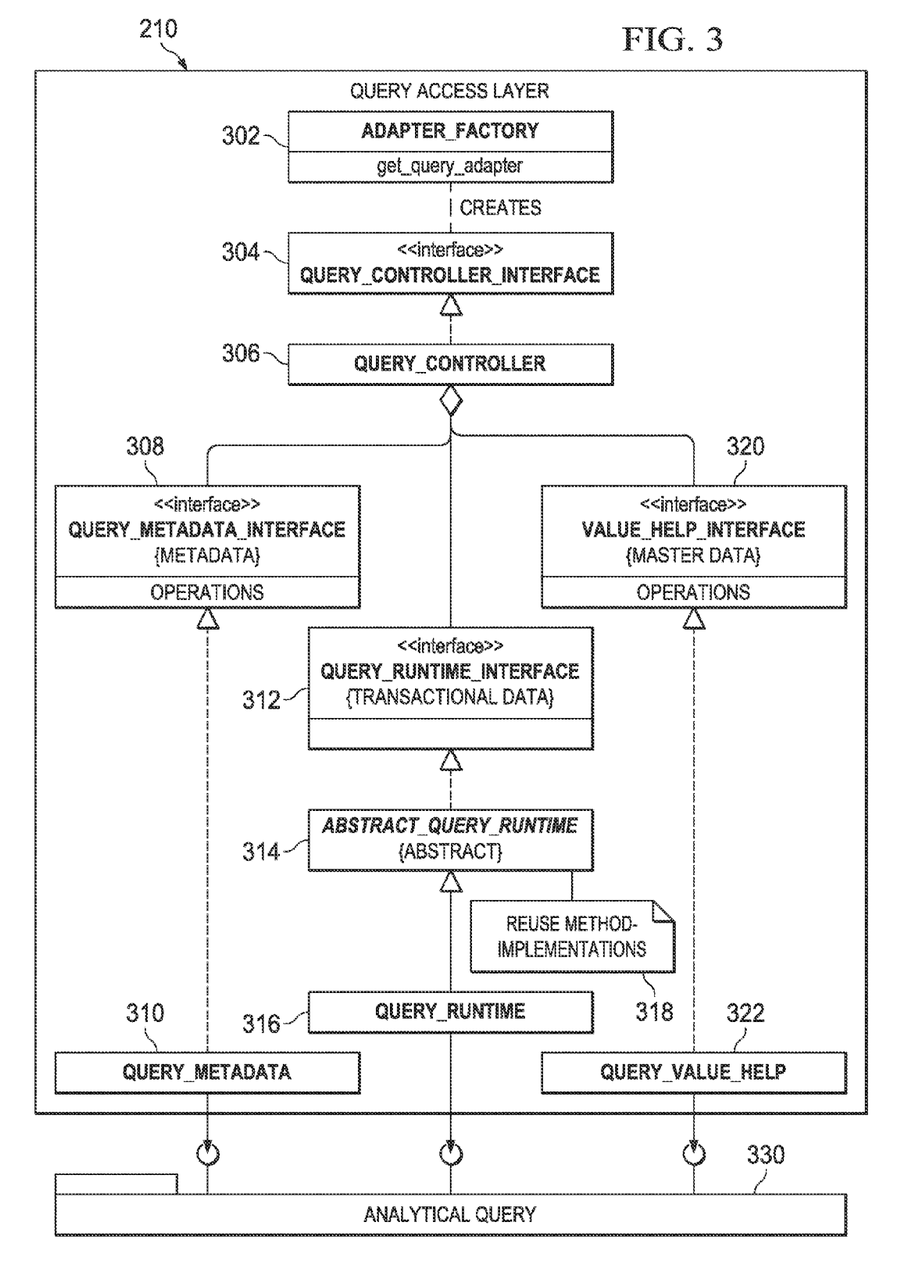
FIG. 3 illustrates components of the query access layer of FIG. 2.

FIG. 3 illustrates components of the example query access layer 210 of FIG. 2. The query access layer 210 includes an adapter factory 302, which is responsible for instantiation of the appropriate classes for a specific query access. Either the settings are provided by the calling entity (for example, "BICS interface must be used for the access") or the factory decides the appropriate class or classes from system conditions (for example, "only MDX interface available"). The layer 210 includes a query controller interface 304, which defines the methods to request the different object providers to work with the query. For example, the interface defines the metadata, query runtime, value help, and the like. The layer 210 includes a query controller 306 which implements the query controller interface 308 for the different interface implementations (for example, BICS interface implementation, MDX interface implementation, and the like) to provide the runtime logic.

The layer 210 includes a query metadata interface 308 which defines the method to receive the metadata of the current query, for example, available measures, dimensions, hierarchies, and the like. The layer 210 includes query metadata 310 which implements the query metadata interface 308 for the different interface implementations to provide the runtime logic. The layer 210 includes a query runtime interface 312 which defines the methods to work with the query and its data, set variables, execute the query runtime and retrieve the data. The layer 210 includes an abstract query runtime 316 which provides re-use functionality 318 for all the interface implementations. The layer 210 includes a value help interface 320 that defines the methods of request value helps for the dimensions of the query. The layer 210 includes a query value help 322 for the different interface implementations to provide the runtime logic. Each feature in the query access layer 210 can be implemented as respective computer software instructions stored on the computer-readable medium of the computer system 100 and executable by the data processing apparatus of the computer system 100 to perform operations to interface with the analytical query access layer 215 and to generate and execute an analytical query 330.

Figure 4:
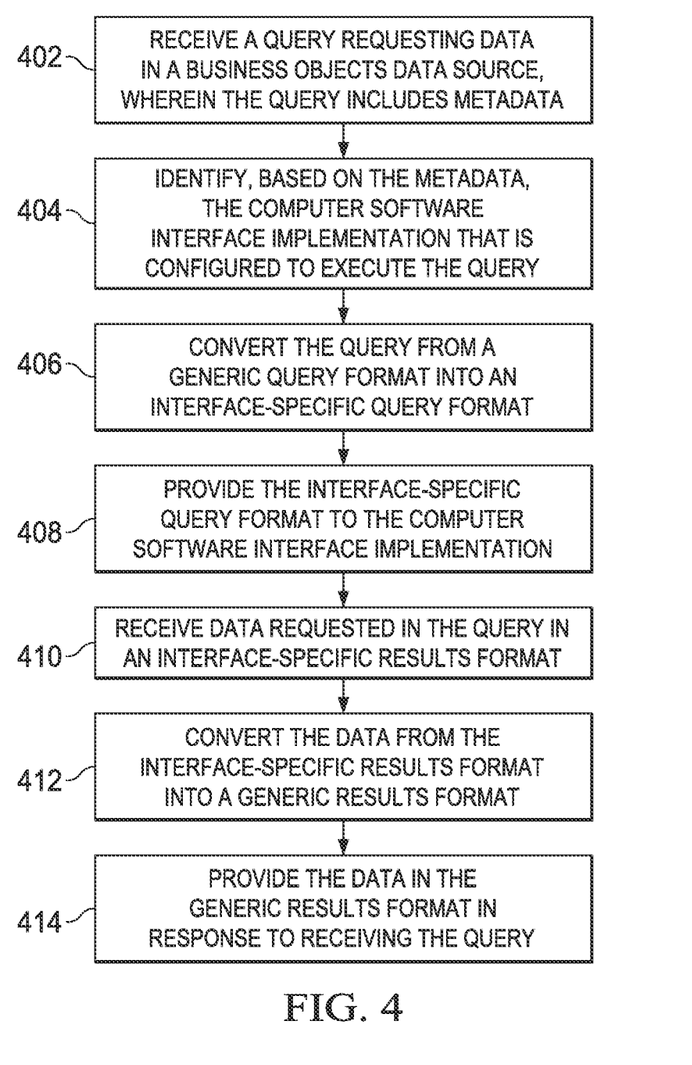
FIG. 4 is a flowchart of an example process to receive a query and provide results through the query access layer of FIG. 2.

FIG. 4 is a flowchart of an example process 400 to receive a query and provide results through the query access layer of FIG. 2. The process 400 can be implemented as computer software instructions executable by data processing apparatus. In some implementations, the computer system 100, and more specifically, the unified access layer 120, can implement the steps of the process 400. At 402, a query requesting data in a business objects data source can be received. The query can include metadata. At 404, the computer software interface implementation that is configured to execute the query can be identified based on the parameter settings, user input, system setup, or the like. At 406, the query can be converted from a generic query format into an interface-specific query format. At 408, the interface-specific query format can be provided to the computer software implementation. At 410, the data requested in the query can be received in an interface-specific results format. At 412, the data can be converted from the interface-specific results format into a generic results format. At 414, the data in the generic results format can be provided in response to receiving the query.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices). The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

In some implementations, one or more aspects of the subject matter described here can be implemented in a cloud computing environment. For example, the client devices and the computer system can be connected by a cloud. One or more of the query, the metadata, and the data that satisfies the query can be stored in the cloud. Alternatively, or in addition, one or more layers of the computer system can be implemented in the cloud.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by data processing apparatus, the method comprising:
    receiving a query requesting data stored in a business objects data source, wherein the query has a generic query format and wherein the query includes one or more parameters that at least in part describes a computer software interface implementation configured to execute the query to identify the data requested in the query;
    identifying, based on the one or more parameters, the computer software interface implementation that is configured to execute the query, wherein the computer software interface implementation specifies an interface-specific query format, wherein the identifying the computer software comprising:
        identifying a plurality of computer software interface implementations, each of which is configured to execute the query,
        identifying, for each of the plurality of computer software interface implementations, a connection between a respective computer software interface implementation and the business objects data source that stores the data requested in the search query, and
        selecting a particular computer software interface implementation as the computer software interface implementation to execute the query based on a particular connection between the particular computer software interface implementation and the business objects data source, wherein the particular connection is a direct connection and the particular computer software interface implementation is a Business Intelligence Consumer Services (BICS) interface implementation;
    converting the query from the generic query format into the interface-specific query format; and
    providing the interface-specific query format to the computer software interface implementation.

2. The method of claim 1, wherein the computer software interface implementation executes the interface-specific query to identify the data requested in the query and obtains the data in an interface-specific results format, and wherein the method further comprises:
    receiving the data requested in the query in the interface-specific results format;
    converting the data from the interface-specific results format into a generic results format; and
    providing the data in the generic results format in response to receiving the query.

3. The method of claim 1, wherein the one or more parameters specifies the computer software interface implementation that is configured to execute the query, and wherein identifying the computer software interface implementation comprises identifying the computer software interface implementation specified in the one or more parameters.

4. The method of claim 1, wherein the one or more parameters specifies the business objects data source on which the query is to be executed, and wherein identifying the computer software interface implementation comprises identifying the computer software interface implementation configured to execute the query on the business objects data source.

5. The method of claim 1, wherein the particular connection is either a direct connection or a remote connection and the particular computer software interface implementation is a multi-dimensional expression (MDX) interface implementation.

6. The method of claim 1, wherein receiving the query, identifying the computer software interface implementation, and converting the query are implemented as a computer software layer positioned between a consumer software application layer from which the query is received and a layer in which the plurality of computer software interface implementations are implemented.

7. A non-transitory computer-readable medium storing computer software instructions executable by one or more data processing apparatus to perform operations comprising:
    receiving a query requesting data stored in a business objects data source, wherein the query has a generic query format and wherein the query includes one or more parameters that at least in part describes a computer software interface implementation configured to execute the query to identify the data requested in the query;
    identifying, based on the one or more parameters, the computer software interface implementation that is configured to execute the query, wherein the computer software interface implementation specifies an interface-specific query format, wherein identifying the computer software interface implementation comprising:
        identifying a plurality of computer software interface implementations, each of which is configured to execute the query,
        identifying, for each of the plurality of computer software interface implementations, a connection between a respective computer software interface implementation and the business objects data source that stores the data requested in the search query, and
        selecting a particular computer software interface implementation as the computer software interface implementation to execute the query based on a particular connection between the particular computer software interface implementation and the business objects data source, wherein the particular connection is a direct connection and the particular computer software interface implementation is a Business Intelligence Consumer Services (BICS) interface implementation;

converting the query from the generic query format into the interface-specific query format; and providing the interface-specific query format to the computer software interface implementation.

8. The medium of claim 7, wherein the computer software interface implementation executes the interface-specific query to identify the data requested in the query and obtains the data in an interface-specific results format, and wherein the operations further comprise:

receiving the data requested in the query in the interface-specific results format;

converting the data from the interface-specific results format into a generic results format; and providing the data in the generic results format in response to receiving the query.

9. The medium of claim 7, wherein the one or more parameters specifies the computer software interface implementation that is configured to execute the query, and wherein identifying the computer software interface implementation comprises identifying the computer software interface implementation specified in the one or more parameters.

10. The medium of claim 7, wherein the one or more parameters specifies the business objects data source on which the query is to be executed, and wherein identifying the computer software interface implementation comprises identifying the computer software interface implementation configured to execute the query on the business objects data source.

11. The medium of claim 7, wherein the particular connection is either a direct connection or a remote connection and the particular computer software interface implementation is a multi-dimensional expression (MDX) interface implementation.

12. The medium of claim 7, wherein receiving the query, identifying the computer software interface implementation, and converting the query are implemented as a computer software layer positioned between a consumer software application layer from which the query is received and a layer in which the plurality of computer software interface implementations are implemented.

13. A system comprising:

one or more data processing apparatus; and a computer-readable medium storing computer software instructions executable by the one or more data processing apparatus to perform operations comprising:

receiving a query requesting data stored in a business objects data source, wherein the query has a generic query format and wherein the query includes one or more parameters that at least in part describes a computer software interface implementation configured to execute the query to identify the data requested in the query;

identifying, based on the one or more parameters, the computer software interface implementation that is configured to execute the query, wherein the computer software interface implementation specifies an interface-specific query format, wherein identifying the computer software interface implementation comprising:

identifying a plurality of computer software interface implementations, each of which is configured to execute the query, identifying, for each of the plurality of computer software interface implementations, a connection between a respective computer software interface implementation and the business objects data source that stores the data requested in the search query, and selecting a particular computer software interface implementation as the computer software interface implementation to execute the query based on a particular connection between the particular computer software interface implementation and the business objects data source, wherein the particular connection is a direct connection and the particular computer software interface implementation is a Business Intelligence Consumer Services (BICS) interface implementation;

converting the query from the generic query format into the interface-specific query format; and providing the interface-specific query format to the computer software interface implementation.

14. The system of claim 13, wherein the computer software interface implementation executes the interface-specific query to identify the data requested in the query and obtains the data in an interface-specific results format, and wherein the operations further comprise:

receiving the data requested in the query in the interface-specific results format;

converting the data from the interface-specific results format into a generic results format; and providing the data in the generic results format in response to receiving the query.

15. The system of claim 13, wherein the one or more parameters specifies the computer software interface implementation that is configured to execute the query, and wherein identifying the computer software interface implementation comprises identifying the computer software interface implementation specified in the one or more parameters.

16. The system of claim 13, wherein the one or more parameters specifies the business objects data source on which the query is to be executed, and wherein identifying the computer software interface implementation comprises identifying the computer software interface implementation configured to execute the query on the business objects data source.

17. The system of claim 13, wherein the particular connection is either a direct connection or a remote connection and the particular computer software interface implementation is a multi-dimensional expression (MDX) interface implementation.

18. The system of claim 13, wherein receiving the query, identifying the computer software interface implementation, and converting the query are implemented as a computer software layer positioned between a consumer software application layer from which the query is received and a layer in which the plurality of computer software interface implementations are implemented.

* * * * *